(No Model.) 2 Sheets—Sheet 1.
S. P. TALLMAN
STOCK CAR.
No. 269,604. Patented Dec. 26, 1882.
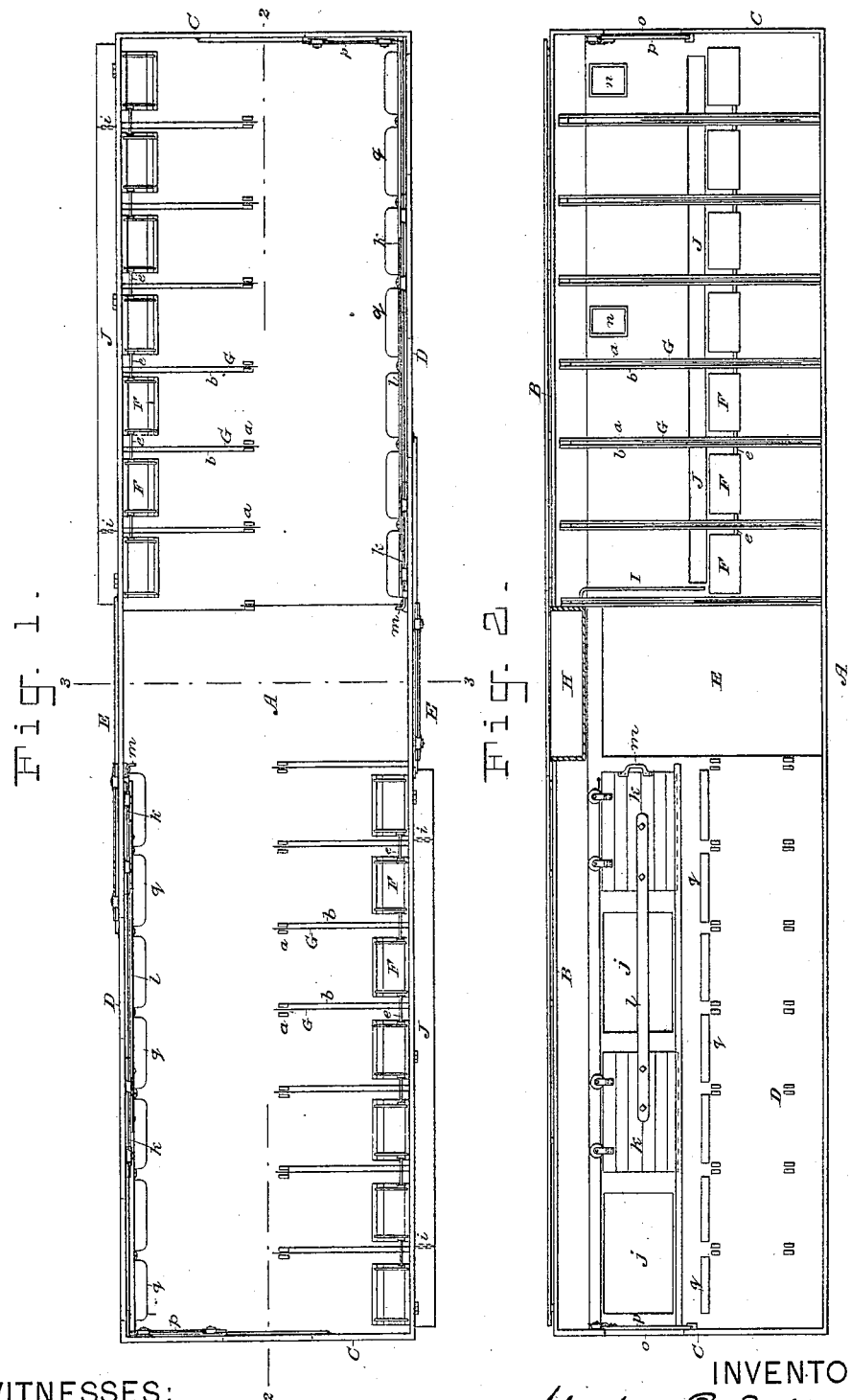
WITNESSES:
INVENTOR:
Stephen P. Tallman
By his Attorneys,
Burke, Fraser & Connett (No Model.) 2 Sheets—Sheet 2.

S. P. TALLMAN.
STOCK CAR.

No. 269,604. Patented Dec. 26, 1882.

WITNESSES:
E. B. Bolton
Geo. H. Fraser

INVENTOR:
Stephen P. Tallman
By his Attorneys,
Burke, Fraser & Cornett

UNITED STATES PATENT OFFICE.

STEPHEN P. TALLMAN, OF DUNELLEN, NEW JERSEY.

STOCK-CAR.

SPECIFICATION forming part of Letters Patent No. 269,604, dated December 26, 1882.

Application filed September 22, 1882. (No model.)

*To all whom it may concern:*

Be it known that I, STEPHEN P. TALLMAN, a citizen of the United States, residing at Dunellen, Middlesex county, New Jersey, have invented certain Improvements in Cars for Transporting Horses, of which the following is a specification.

Heretofore, so far as I am aware, cars for the transportation of stock have been constructed with especial reference to the needs of cattle, and such are not well adapted for the carriage of horses and mules, owing in part to the difference in shape and physical structure between such and the various kinds of cattle, and in part to the fact that horses and mules require the greatest care in transportation, as they must be delivered sound in every particular, while cattle are usually shipped for slaughter and their physical soundness is not ordinarily considered a matter of so much importance. For example, if a valuable horse receives an injury—such as a sprain—in transit, his value is nearly destroyed, while the same injury to a cow or hog which is designed for slaughter would not materially affect its value. Horses are also sensitive to changes of temperature and drafts of air, and the ordinary cars for cattle are entirely unsuited to their carriage, for the reason that they are open and unsupplied with means for regulating the temperature.

To provide a car that will be well adapted to the safe transportation of horses and mules in general, and valuable horses for racing and breeding in particular, is the object of my present invention, which I will now describe with reference to the accompanying drawings, in which—

Figure 3:
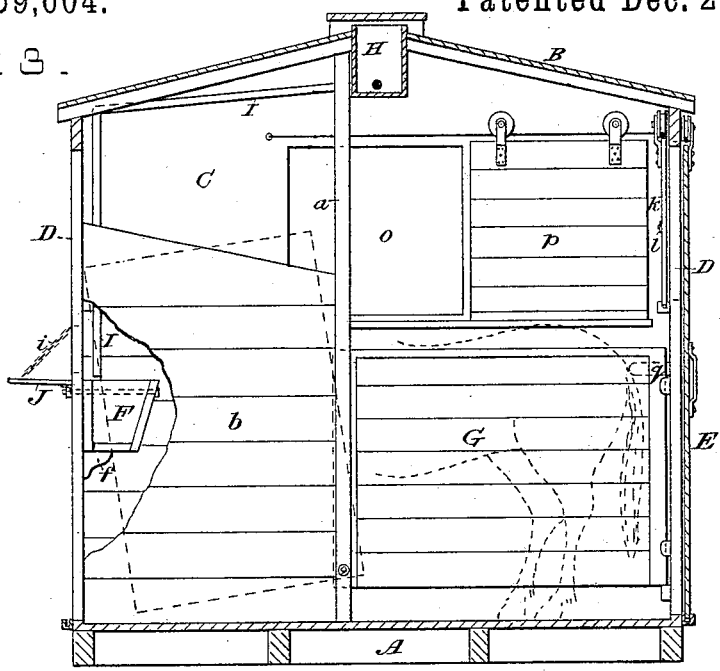
Figure 4:
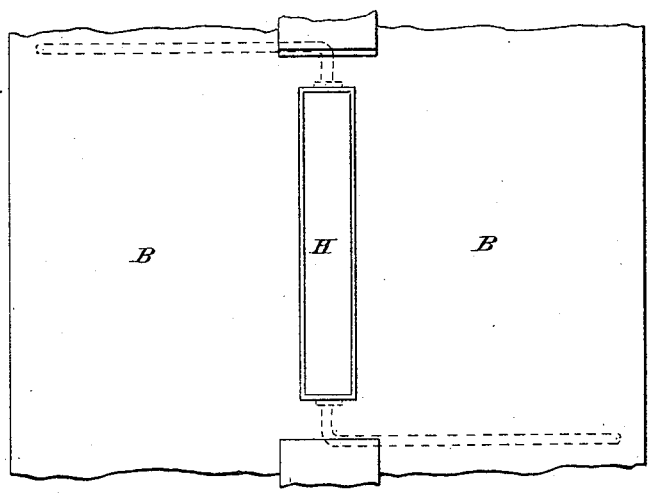
Figure 5:
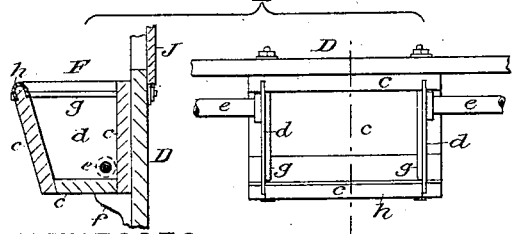
Figure 6:
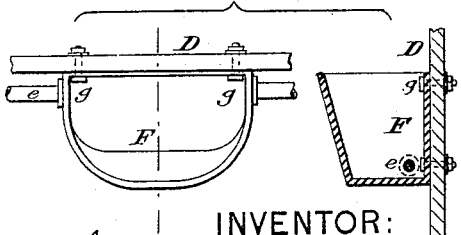

Figure 1 is a plan of my improved car with the roof removed. Fig. 2 is a longitudinal vertical mid-section of the same. Fig. 3 is a vertical transverse mid-section of the same. The planes of these sections are indicated by the dotted lines in Fig. 1. Fig. 4 is a plan of the central portion of the car-roof. Figs. 3 and 4 are drawn to a scale double that of Figs. 1 and 2. Fig. 5 is a plan and cross-section of the feed-trough enlarged, and Fig. 6 is a view illustrating a modification of the same.

Some of the features of my present invention are substantially the same as those shown in former patents of mine, notably my patent No. 262,707, of August 15, 1882, which may be referred to in this connection. The parts I now employ which were shown in the above-named patent are the shallow stalls, the membered posts at the entrance of same, the gates hinged in said posts and arranged to turn up into the stalls, and the elastic fastenings for the gates when down.

A represents the car-floor; B, the roof, C the ends, and D the sides, of the car. These ends and sides are made perfectly close and tight, but suitable means are provided for admitting air to the car in regulated quantities.

E E are the doors, which are arranged at the middle of the car and on opposite sides. The space from the door to the end of the car is divided up into shallow stalls, formed (see Fig. 3) by the membered posts $a$ and close partitions $b$, extending from these posts to the side of the car. Half these stalls are arranged on one side of the car and half on the other side, as in my former patent. Any number of stalls may be employed, according to the length of the car.

F F are the feed-troughs. In my cattle-car these were arranged to set on the floor, and the gate, when turned up, rested on the trough. In the present case the troughs are arranged about forty-two inches (more or less) above the floor, in order to suit them to the needs of the horses, and the gates G, which in this case are made without openings and hung near the floor, turn up and rest between the ends of adjacent troughs.

The preferred construction of the troughs is best shown in Fig. 5, wherein $c\ c\ c$ represent the front, bottom, and back of the trough; and $d\ d$, the ends, which are made of cast-iron and galvanized, and which fit into grooves in the wooden parts $c\ c$. The troughs on one side of the car are connected together throughout by means of sections of pipe $e$, the ends of which screw into the ends $d$ of the troughs, as shown. The pipes are arranged as close to the side of the car as may be, so as to allow all the room possible for the gate when it is turned up. The troughs are supported on brackets $f$, and are secured to the side of the car by bolts $g$, which extend across the trough near the ends and pass through the sides of the car. Where the front of the trough is made of wood, I bind its edge with a metal strip, $h$, to prevent the horses from gnawing it.

In lieu of employing wood for the troughs, I may form them entirely of metal, in one or more pieces. Their construction of thin cast-iron, in one piece and galvanized, is shown in Fig. 6. In lieu, also, of employing pipe-sections to connect the troughs, I may also cast the hollow or tubular connection in one piece, with the trough on its ends.

My object in connecting the troughs is to enable me to supply them with water conveniently. The means for accomplishing this consists of a long receiver, H, set in the roof of the car, with its long axis in or parallel with the longitudinal axis of the car, from which pipes I I extend down to the first or nearest troughs of the series, as shown. Water is supplied to the receiver from the tanks along the road as needed, and the elongation of the receiver enables the train-men to make the connection with ease, as the car does not require to be adjusted with nicety with respect to the supply-pipe. The pipes I are also shortened as much as they can be conveniently by this construction of the receiver.

In the sides of the car, just above the series of feed-troughs, are arranged (see Figs. 1 and 3) hinged doors J, whereat to supply feed to the troughs, and these are hinged at their lower edges and arranged to turn down, as shown, by preference, so as to be suspended in a horizontal or nearly horizontal position, by means of hooks, chains, or cords $i$. They thus form tables or shelves to receive the hay or other feed, and enable the attendant to supply it more conveniently to the troughs. These doors should be hinged about on a level with the tops of the troughs, and be made to close up tight. Any kinds of hooks or fastening may be employed to secure them.

In order to provide for a regulated supply of air to the car in transit, I arrange in the side of the car opposite to the horses' heads, and up near the top of the car, two or more window-apertures, $j\ j$, and provide these with sliding covers $k\ k$, hung in a well-known way. These covers I connect by a bar, $l$, and I provide the cover nearest the center of the car with a handle or grip, $m$, whereby the attendant, who rides in the central space in the car, may readily operate the slides to close, partly close, or open the apertures and admit air, as needed. Being close to the top of the car, these apertures serve as ventilators also. One opening might serve; but I prefer several smaller ones, arranged in a series. They may be of any size.

It will be understood that the openings are arranged behind the horses in each set of stalls, and there are also, by preference, small glazed windows $n\ n$, Fig. 2, one or more, arranged in the sides of the car, at the horses' heads. These are for light, and will be useful in very cold weather, when the car is closed up. I also prefer to arrange an opening, $o$, with a suitable sliding cover, $p$, in each end of the car, for the regulated admission of air. These may also be of any desired size.

It is very important in the transportation of horses that they should appear well on reaching their destination, and to this end it is desirable that they should be prevented from rubbing and matting the hair in their tails. If permitted to back against the rough side of the car, they will inevitably mar the appearance of their tails, and to prevent this I arrange at the back of each stall a board or strip, $q$, affixed to the side of the car and arranged to project a few inches therefrom. This strip is at the proper height to strike the horse just below the root of the tail, to prevent him from touching the side of the car at all. The position of strip $q$ with respect to the horse is illustrated in dotted lines in Fig. 3. I prefer to pad this strip on the edge, and I sometimes pad the side of the car itself below the strip $q$ to protect the horses when lying down. The gates G being somewhat yielding, owing to the employment of elastic fastenings similar to those described in my former patents, the horses will be protected against sudden jars in stopping the cars; but I usually pad the ends of the car inside to protect the horses in the end stalls.

I have shown the gates G as higher than those ordinarily employed in cattle-cars, and the stalls proportionately deeper. This construction is preferred; but I do not wish to limit myself to any particular height of gate or depth of stall.

Having thus described my invention, I claim—

1. A close car for transporting horses, constructed similar to a box-car, provided with doors at the centers of its sides, and a cross gangway or passage connecting the two doors with shallow stalls and partition-gates, with feed-troughs elevated above the floor, as shown, and with ventilating-apertures arranged in the sides of the car, near the roof only and back of the animals, substantially as and for the purposes set forth.

2. A close car for transporting horses, constructed similar to a box-car, with a door at the middle of each side and a gangway or passage extending across the center of the car, and said car provided with stalls and partition-gates, as shown, with elevated feed-troughs, and with an elongated water-receiver, H, set in the ridge of the car-roof, and arranged to extend across the passage at the center of the car, said receiver being connected at its respective ends with the feed-troughs on opposite sides of the car by means of pipes I I, as set forth, and for the purposes specified.

3. A stock-car provided with shallow stalls and hinged partition-gates arranged to turn up into same, as shown, and with elevated feed-troughs F, made shorter than the width of the stalls to leave space for the gates to turn up into, and said troughs connected in a continuous series by means of short sections of pipe $e$, substantially as set forth.

4. A close or tight car for the transportation of horses, provided with stalls and partition-gates arranged in the ends of the car, as shown, with central doors, E, in opposite sides of the car, and a central space in the car between the doors for the attendant of the horses, substantially as set forth.

5. A car for transporting live stock, provided with strips $q$ opposite to the stalls, to prevent the animals from rubbing their tails against the side of the car, substantially as set forth.

6. A close car for transporting horses, provided with stalls and partition-gates, as shown, with window-apertures $j$, having sliding covers, arranged in the side of the car opposite to the stalls, and with one or more glazed apertures, $n$, for light, arranged in the side of the car opposite apertures $j$, substantially as set forth.

In witness whereof I have hereunto signed my name in the presence of two subscribing witnesses.

S. P. TALLMAN.

Witnesses:
    HENRY CONNETT,
    ARTHUR C. FRASER.